Patented Mar. 14, 1944

2,344,191

UNITED STATES PATENT OFFICE 2,344,191

CRYSTALLIZING COATING COMPOSITION

William A. Waldie, Dayton, Ohio, assignor, by mesne assignments, to Chemical Developments Corporation, Dayton, Ohio, a corporation of Ohio No Drawing. Application April 12, 1941, Serial No. 388,340

6 Claims. (Cl. 106—173)

This invention relates to a composition and method of making a crystallizing lacquer. The coating composition is adapted for decorating metal, glass, wood, fabric, paper and the like so as to provide it with a pleasing, durable finish having a crystalline surface pattern.

One of the principal objects of this invention is to make a coating composition which can be applied by spraying, flowing or dipping and which will dry to a tough, wear resistant film which has a substantially uniform crystalline-like surface.

Another object is to provide a coating composition which can be used as a one coat finish for articles.

Another object is to make a liquid coating composition which can be applied to a surface by spraying and dried to produce a tough, adherent, crystalline finish of uniform texture.

Another object is to provide an air drying or forced air drying coating composition which can be applied as a varnish, paint or enamel to produce a crystalline finish.

These and other objects and advantages will appear from the following description.

I have discovered that a crystallizing coating composition can be made by "cold cutting" certain crystalline substances in a volatile solvent and incorporating this in different film forming ingredients such as utilized in making lacquers, varnishes, paints and enamels. I produce a composition which when applied in the conventional manner as paints and lacquers and air dried or baked provides a durable finish of a crystalline character.

Heretofore so-called "crystalline" or "frosty" finishes have been made by drying compositions comprising substantial amounts of China-wood oil or the like highly unsaturated oils under special atmospheric conditions but my crystalline finish differs essentially from this type of coating. In prior crystalline finishes the surface of the dried coating film is rough and broken due to the formation of contiguous crater-like imperfections. On the contrary, the crystalline film formed by my coating composition is substantially smooth and continuous over the surface of the finished article and is free from craters and ridges which detrimentally affect the durability of the finish.

My improved crystallizing lacquer is made by combining a crystallizing substance with a film forming constituent and dissolving the mixture of substances in a common solvent to form a coating composition. In general, I have found that the crystallizing substance should be dissolved in a low boiling solvent so that the composition, when applied as a film and air dried, will produce a crystalline finish.

As typical examples of my invention and without restricting the same thereto, the following formulations are given:

Example I

| | |
|---|---|
| Acetanilide | lbs__ 14–18 |
| Denatured ethyl alcohol | gals__ 6–10 |

The crystalline acetanilide is stirred into the alcohol and dissolved to form the crystallizing solution.

Example II

| | |
|---|---|
| Ethyl cellulose | lbs__ 150–170 |
| High solvency naphtha (coal tar or petroleum naphtha) | gals__ 115–120 |
| Butanol | gals__ 18– 22 |

The ethyl cellulose is dissolved in the combination of solvents to produce a cellulose film forming constituent.

Example III

In forming the finished crystallizing lacquer, the following is used:

| | Gallons |
|---|---|
| Ethyl cellulose solution (Example II) | 8–10 |
| Acetanilide crystallizing solution (Example I) | 4– 6 |
| Amyl alcohol (Pentasol) | 1– 4 |

The crystallizing lacquer made as disclosed in Example III is a substantially clear composition which can be sprayed onto the article or surface to be finished and air dried to provide it with a tough, adherent crystalline coating. The ethyl cellulose is a film forming constituent and the acetanilide functions as the crystallizing agent.

Where it is desired to have a pigmented or colored crystalline coating, this may be effected by adding pigment dispersed in the film forming constituent similarly as in the making of paints, enamels and the like. As a typical example, the following formulation is given:

Example IV

| | |
|---|---|
| Ethyl cellulose solution (Example II) | 8–10 gals. |
| Acetanilide crystallizing solution (Example I) | 4– 6 gals. |
| Pigment ground in cellulose solution (Example II) | Added in amount to produce proper coverage as desired. |
| Amyl alcohol (Pentasol) | Added in sufficient amount to provide a sprayable composition. |

When desired, spirit soluble dye, such as aniline or the like, may be employed with or without pigment particles. In this instance, a sufficient amount of the dye is dissolved in the ethyl alcohol and incorporated with the film forming and crystallizing constituents.

My crystallizing coating composition exhibits excellent hiding power without the presence of pigment, dye, or the like, due to the light ray defraction effected by the crystals in the dried film.

In the foregoing examples, the crystallizing lacquer is formed by "cold cutting" the constituents and the composition is applied and air dried or force air dried similarly as in the case of nitrocellulose, ethyl cellulose and the like cellulose lacquer compositions.

In place of acetanilide as the crystallizing substance, there may be used other organic or inorganic crystallizing substances which can be dissolved in the solvent and will crystallize out upon evaporation of the solvent. I prefer to use acetanilide because of its ready solubility in the low cost denatured alcohol solvent and also because it has very little odor.

As examples of other crystallizing substances, materials such as salicylic acid, phthalic acid, saliformin and the like may be used. The crystalline substance selected should be one which is readily dissolved in the ordinary low boiling commercial solvents and one which will not react with the other constituents to form a non-crystallizing compound. It is also desirable to select a crystallizing substance which will produce the crystalline effect with the use of a minimum amount of material and solvent.

In place of ethyl cellulose, other film forming ingredients, such as nitrocellulose, cellulose acetate, dextran acetate, shellac, dammar, accroides, manila, sandarac, elemi and ester gums may be utilized. These gums are preferably spirit soluble and have been dewaxed.

Various resins, natural and synthetic, drying oils and the like may be incorporated as the film forming constituent of my crystallizing lacquer so long as the amount of drying oil and resin is not added in sufficient amount to inhibit the crystallizing out of the crystalline substance. Otherwise, a crystalline finish will not be produced. Further, by incorporating the crystalline substance in a low boiling solvent a drying oil recrystallizing lacquer can be formed including resin, such as in a short oil varnish and the crystallizing finish produced by applying the coating composition to the article and allowing it to air dry a sufficient time to bring about evaporation of the low boiling solvent and crystallizing out of the substance and thereafter baking the film to a hard, tough, abrasive resistant finish.

Furthermore, oil modified alkyd resins which are compatible with the cellulose ester or ethyl cellulose constituent can be used to modify the cellulose ester or ether and produce a tough, drying oil modified film forming constituent. This is incorporated with sufficient amount of the crystallizing substance dissolved in low boiling solvent to produce a crystalline drying coating composition.

It will be understood that my invention is not limited to the specific composition as illustrated in the examples but may be modified to suit different conditions and uses without departing from the spirit and scope of my invention.

Having thus fully described my invention, what I claim as new and desire to secure by Letters Patent is:

1. A crystallizing coating composition comprising: 4 to 6 gallons of a solution consisting of 14 to 18 pounds of acetanilide dissolved in 6 to 10 gallons of alcohol; 6 to 8 gallons of a solution comprising 150 to 170 pounds ethyl cellulose, 115 to 120 gallons hydrocarbon solvent and 18 to 22 gallons of butanol; and 1 to 4 gallons of amyl alcohol.

2. A crystallizing coating composition comprising: 4 to 6 gallons of a solution comprising 14 to 18 pounds of a substance selected from the class consisting of acetanilide, salicylic acid, phthalic acid and saliformin, and 6 to 8 gallons of alcohol; 6 to 8 gallons of a solution comprising 150 to 170 pounds of a substance selected from the class consisting of ethyl cellulose, nitrocellulose, cellulose acetate and dextran acetate, 115 to 120 gallons of hydrocarbon solvent, and 18 to 20 gallons of butanol; and 1 to 4 gallons of amyl alcohol.

3. A crystallizing coating composition comprising: 4 to 6 gallons of a solution comprising 14 to 18 pounds of a substance selected from the class consisting of acetanilide, salicylic acid, phthalic acid and saliformin, and 6 to 8 gallons of alcohol; 6 to 8 gallons of a solution comprising 150 to 170 pounds of a substance selected from the class consisting of shellac, dammar, accroides, manila, sandarac, elemi and ester gums, 115 to 120 gallons of hydrocarbon solvent, and 18 to 20 gallons of butanol; and 1 to 4 gallons of amyl alcohol.

4. A crystallizing coating composition comprising 4 to 6 gallons of a solution consisting of 14 to 18 pounds of acetanilide dissolved in 6 to 10 gallons of alcohol; 8 to 10 gallons of a solution comprising 150 to 170 pounds of ethyl cellulose, 115 to 120 gallons of hydrocarbon solvent, and 18 to 22 gallons of butanol; pigment ground in said cellulose solution in quantity sufficient to yield the desired hue; and amyl alcohol in quantity sufficient to produce a sprayable composition.

5. A crystallizing coating composition comprising 4 to 6 gallons of a solution comprising 14 to 18 pounds of a substance selected from the group consisting of acetanilide, salicylic acid, phthalic acid and saliformin, and 6 to 10 gallons of alcohol; 8 to 10 gallons of a solution comprising 150 to 170 pounds of a substance selected from the group consisting of ethyl cellulose, nitrocellulose, cellulose acetate and dextran acetate, 115 to 120 gallons of hydrocarbon solvent and 18 to 22 gallons of butanol; pigment ground in said cellulose solution in quantity sufficient to produce the desired hue; and amyl alcohol in quantity sufficient to produce a sprayable composition.

6. A crystallizing coating composition comprising 4 to 6 gallons of a solution comprising 14 to 18 pounds of a substance selected from the group consisting of acetanilide, salicylic acid, phthalic acid and saliformin, and 6 to 10 gallons of alcohol; 8 to 10 gallons of a solution comprising 150 to 170 pounds of a substance selected from the group consisting of shellac, dammar, accroides, manila, sandarac, elemi and ester gums, 115 to 120 gallons of hydrocarbon solvent and 18 to 22 gallons of butanol; pigment ground in oil in quantity sufficient to produce the desired hue; and amyl alcohol in quantity sufficient to produce a sprayable composition.

WILLIAM A. WALDIE.